US009449330B2

(12) United States Patent
Smith et al.

(10) Patent No.: US 9,449,330 B2
(45) Date of Patent: Sep. 20, 2016

(54) SELF-SERVE API FOR GAME MECHANICS TOOL

(75) Inventors: Keith Smith, Seattle, WA (US); Jeff Malek, Seattle, WA (US); Collin Watson, Seattle, WA (US); Lee McFadden, Seattle, WA (US); Brian Oldfield, Seattle, WA (US)

(73) Assignee: BIGDOOR MEDIA, INC., Seattle, WA (US)

( * ) Notice: Subject to any disclaimer, the term of this patent is extended or adjusted under 35 U.S.C. 154(b) by 1075 days.

(21) Appl. No.: 13/091,054

(22) Filed: Apr. 20, 2011

(65) Prior Publication Data
US 2012/0270661 A1  Oct. 25, 2012

(51) Int. Cl.
| | |
|---|---|
| *G06Q 30/00* | (2012.01) |
| *G06Q 30/02* | (2012.01) |
| *A63F 13/332* | (2014.01) |
| *A63F 13/69* | (2014.01) |
| *A63F 13/355* | (2014.01) |
| *A63F 13/30* | (2014.01) |
| *A63F 13/352* | (2014.01) |
| *A63F 13/71* | (2014.01) |
| *A63F 13/70* | (2014.01) |
| *A63F 13/73* | (2014.01) |
| *A63F 13/79* | (2014.01) |

(52) U.S. Cl.
CPC ........... *G06Q 30/0207* (2013.01); *A63F 13/12* (2013.01); *A63F 13/332* (2014.09); *A63F 13/355* (2014.09); *A63F 13/69* (2014.09); *A63F 13/352* (2014.09); *A63F 13/70* (2014.09); *A63F 13/71* (2014.09); *A63F 13/73* (2014.09); *A63F 13/79* (2014.09); *A63F 2300/209* (2013.01); *A63F 2300/6009* (2013.01); *G06Q 30/0208* (2013.01); *G06Q 30/0209* (2013.01)

(58) Field of Classification Search
CPC ........ A63F 13/00; A63F 13/12; A63F 13/30; A63F 13/70; A63F 13/73; A63F 13/79; G06Q 30/0207; G06Q 30/0208; G06Q 30/0209; G09B 1/00
USPC ................ 463/1, 42, 43; 345/650, 661, 676; 715/700, 762, 720; 707/805; 705/14.1, 705/14.11, 14.12
See application file for complete search history.

(56) References Cited

U.S. PATENT DOCUMENTS

| | | | | |
|---|---|---|---|---|
| 8,202,159 | B1 * | 6/2012 | Ocko | ...................... A63F 13/10 |
| | | | | 463/25 |
| 8,317,624 | B1 * | 11/2012 | Lam | ................................ 463/42 |
| 2007/0087822 | A1 * | 4/2007 | Van Luchene | .................. 463/25 |

(Continued)

*Primary Examiner* — William H McCulloch, Jr.
*Assistant Examiner* — Chase Leichliter
(74) *Attorney, Agent, or Firm* — Pillsbury Winthrop Shaw Pittman LLP

(57) ABSTRACT

Game mechanics may be incorporated into a web site, mobile site, and/or app using an automated access, self-serve platform. A user interface may be generated based on input provided by or on behalf of a publisher of a site and/or app. The user interface may be configured to be incorporated with the site and/or app. An economy governing game mechanics associated with the user interface may be defined. The user interface may be provided for integration with the site and/or app. Integration of the user interface with the site and/or app may provide the game mechanics to the site and/or app. In some implementations, generating the user interface may include generating, at a gamification server, a widget configured to provide the user interface, the site and/or app being provided by a site server, the gamification server being separate and distinct from the site server.

29 Claims, 2 Drawing Sheets

(56) References Cited

U.S. PATENT DOCUMENTS

| | | | |
|---|---|---|---|
| 2007/0111770 A1* | 5/2007 | Van Luchene | 463/7 |
| 2008/0004116 A1* | 1/2008 | Van Luchene et al. | 463/42 |
| 2008/0125226 A1* | 5/2008 | Emmerson | 463/42 |
| 2009/0149246 A1* | 6/2009 | Opaluch | 463/29 |
| 2011/0107220 A1* | 5/2011 | Perlman | 715/720 |
| 2012/0150759 A1* | 6/2012 | Tarjan | G06Q 30/02 705/319 |
| 2012/0244948 A1* | 9/2012 | Dhillon | A63F 13/10 463/42 |
| 2012/0259785 A1* | 10/2012 | Ha | G06Q 50/01 705/304 |

* cited by examiner

SELF-SERVE API FOR GAME MECHANICS TOOL

FIELD OF THE INVENTION

The invention relates to incorporating game mechanics into a web site, mobile site, and/or app using an automated access, self-serve platform.

BACKGROUND OF THE INVENTION

Gamification is the use of game play mechanics for non-game applications, particularly consumer-oriented web and mobile sites, as well as apps, in order to encourage people to adopt the applications. Game mechanics are constructs intended to produce enjoyable gameplay. Put another way, game mechanics include elements of a game that allow for a fun and engaging user experience, such as, for example goals; points; collecting badges, awards, trophies, and/or other collectable items; rankings and leaderboards; levels; exchange of virtual and/or real goods and currencies; and feedback loops. The game mechanics are the building blocks that can be applied and combined to "gamify" any non-game context.

Gamification strives to encourage users to engage in desired behaviors in connection with the applications. Gamification works by making technology more engaging, and by encouraging desired behaviors, taking advantage of humans' psychological predisposition to engage in gaming. By implementing game mechanics in sites and/or apps, users may be encouraged to perform tasks that they ordinarily might consider boring, such as completing surveys, shopping, or reading web sites. Typically, in order to gamify a web or mobile site, a publisher must manually implement game mechanics with the site and/or app.

SUMMARY

Implementations of the present technology provide a self-serve approach for incorporating game mechanics with an existing or new web site, mobile site, and/or app using an automated access, self-serve platform. Game mechanics may be incorporated into a web site, mobile site, and/or app using a self-serve application programming interface (API) tool, in accordance with some implementations. At a gamification server, a user interface may be generated for a user visiting a site and/or utilizing an app provided by a site server. In some implementations, a widget and/or other graphical control element may be generated that is configured to serve as such a user interface. The user interface may be configured to be incorporated with the site and/or app. The gamification server may be separate and distinct from the site server. An economy may be defined at the gamification server that governs game mechanics associated with the user interface. The economy may be based on and/or include business rules and/or logic. The user interface may be provided for integration with the site and/or app. Integration of the user interface with the site and/or app may provide the game mechanics to the site and/or app. In some implementations, the user interface may be generated based on input provided by or on behalf of a publisher of a site and/or app.

One aspect of the disclosure relates to a system for incorporating game mechanics with a web site, mobile site, and/or app using a self-serve application programming interface (API) tool, in accordance with one or more implementations. The system may include at least one end-user computing platform, a site server, external resources, a gamification server, and/or other components, all being in communication via a network.

The site server may be configured to host a web site, mobile site, and/or app accessible by the end-user computing platform. Such a site and/or app may facilitate online commerce, media presentation, and/or other functions associated with web sites, mobile sites, and/or apps. The site server may be configured to provide one or more apps accessible and/or executable by the end-user computing platform. The term "app" may generically describe a web-based application tailored to specific client computing platform form factors and user interfaces.

The gamification server may be configured to provide a self-serve application programming interface that allows a publisher of a web site, mobile site, and/or app to incorporate game mechanics with the site(s) and/or app(s). The gamification server may be configured to execute a gamification program. The gamification program may be configured to provide a self-serve application programming interface tool that allows a publisher of a web site, mobile site, and/or app to incorporate game mechanics with the site(s) and/or app(s). The gamification program may be configured to operate in concert with the site server and/or with sites and/or apps provided by the site server.

According to some implementations, a publisher of a site (e.g., a web site and/or a mobile site) and/or an app provided by the site server may access the gamification server via the network to manipulate one or more modules of the gamification program. The gamification server may provide a site and/or app to facilitate interactions between the publisher and the gamification program. Actions performed by the publisher with the gamification program may affect one or more game mechanics and/or other features of the site and/or app in real time, near-real time, and/or at another time. In some implementations, the gamification program may provide a live representation of the site and/or app to the publisher so changes and/or modifications made to the game mechanics of the site and/or app are viewable in real time.

The gamification program may include one or more computer program modules and/or instructions that may be executed by the processor(s). The one or more computer program modules may include one or more of user interface configuration modules, economy configuration modules, analytics modules, and/or other modules. The user interface configuration modules may include one or more of a profile module, a check-in module, a sharing module, an achievements module, a leaderboard module, a logo module, and/or other modules. The economy configuration modules may include one or more of a currency module, an achievements editing module, a transaction module, a level groups module, an award groups module, a good groups module, a URL module, an attributes module, and/or other modules. The analytics modules may include one or more of temporal reports module, an API reports module, an awards reports module, a goods reports module, a level reports module, a points reports module, a user reports module, and/or other modules.

The user interface configuration modules may be configured to generate and maintain a user interface that can be incorporated with a site (e.g., a web site and/or a mobile site) and/or app provided by the site server. The user interface may serve as a graphical interface for a user visiting the site or utilizing the app. For example, the user interface may allow the user to track progress and/or other aspects of associated with the game mechanics offered by the site and/or app. Once the user interface is generated at the gamification server, the user interface may be provided for integration with the site and/or app. Integration of the user interface with the site and/or app may provide game mechanics to the site and/or app. According to some implementations, providing the user interface for integration with the site and/or app may include providing, to the publisher, code corresponding to the user interface for insertion into code for the site and/or app. In some embodiments, API calls may be authenticated by one or more of the user interface configuration modules. Such authentication may be performed via one or more encrypted communication channels associated with the gamification server, the site server, and/or other components of the system.

The profile module may be configured to allow users to sign into the user interface and/or site and/or app via a third-party account. By way of non-limiting example, a user may sign into the user interface via their Facebook™ account using a Facebook™ Connect feature associated with the gamification server. The profile module may be configured to provide, for presentation to a user, analytics associated with the game mechanics of the site and/or app. The profile module may allow the publisher may select one or more achievement representations that are viewable from the user interface. Achievement representations are described in further detail in connection with the achievements editing module. The profile module may allow the publisher may select a count to be viewable from the user interface for individual ones of viewable achievement representations.

The check-in module may be configured to allow the publisher of the site and/or app to select whether to enable the user interface to reward users that check in to the user interface and/or the site and/or app. The check-in module may be configured to allow users, by checking in, to show that they have visited the site and/or utilized the app. Visiting the site may allow users to earn points for repeat visits and/or utilizations.

The sharing module may be configured to allow the publisher of the site and/or app to select whether to enable the user interface from rewarding users that share content. The sharing module may be configured to allow users to earn points for sharing content and/or links to pages on the site and/or app. In some implementations, the sharing module may be configured to allow users to earn points for visitors that visit the site and/or app by following shared links.

The achievements module may be configured to allow the publisher to select whether to enable the user interface from displaying representations of which achievements a user has earned and/or which available achievements the user has not earned. The achievements module may be configured to provide a button, icon, and/or other selectable graphic that allows a user to display one or more available achievements.

The leaderboard module may be configured to allow the publisher and/or a user to select whether to enable the user interface from displaying a leaderboard. A leaderboard may be a board or list on which the currencies, points, and/or scores of one or more leading users are displayed. The leaderboard module may be configured to allow the publisher and/or a user to select one or more metrics reflected by the leaderboard. Examples of such metrics may include counters associated with achievements and/or other statistics associated with the game mechanics of the site and/or app. The leaderboard module may be configured to allow the publisher and/or a user to select a type of leaderboard to be displayed by the user interface. Types of leaderboards may include a "top-ten" leaderboard, a leaderboard relative to a user, and/or other formats for leaderboards. According to some implementations, a top ten leaderboard may display the top users, while a relative-to-user leaderboard may display a given user's current rank and three users above and six users below the given user's current rank.

The logo module may be configured to allow the publisher of the site and/or app to select a logo and/or other graphics to be displayed by the user interface. In some implementations, the publisher can upload a graphic and/or provide a URL to a graphic. The logo module may be configured to scale graphics provided by the publisher so that the graphics display in a predetermined space within the user interface. A logo and/or other graphic may include a hyperlink to various content and/or sites.

The economy configuration modules may be configured to define and/or modify an economy governing the game mechanics of the site and/or app. The economy includes the exchange and consumption of virtual goods and services using currency and loyalty points by utilizing game mechanics. In exemplary implementations, this may create user engagement, incentivize virality, and/or enable user monetization.

The currency module may be configured to define one or more aspects of one or more currencies used in conjunction with the site and/or app. In some implementations, currency and "points" may be one and the same. A currency may operate as a counter that counts user actions, a point system, a true virtual currency for purchase transactions, and/or a tracking system for other actions in the economy. Examples of aspects of a currency that may be defined by the currency module include a currency title, currency type, a currency description, an exchange rate, and/or other aspects of the currency. The currency title may be the name of the currency as determined by the publisher. The currency description may include a textual description for the currency as provided by the publisher. The currency exchange rate may be a ratio at which a unit of currency defined by the currency module can be exchanged for real currency (e.g., U.S. dollars).

The currency type of a given currency may include redeemable, non-redeemable, purchase, hybrid, reward, über, experience, social, skill, and/or another type of currency. The currency type may be selected based on how the currency is utilized by the site and/or app. With redeemable-type currencies, users will be able to exchange the currency for virtual gifts and goods, content access, and/other virtual and real items and services. With non-redeemable-type currencies, points associated with a user may be added or deducted, but the currency will not be exchangeable for virtual or real items and/or services. With purchase-type currencies, users are only able to gain the currency by buying it with real money. The exchange rate may be established by the publisher via the currency module. With hybrid-type currencies, users may be rewarded with the currency as well as purchase it with real money. With reward-type currencies, the currency is given away to users who perform actions valued by the publisher of the site and/or app. With über-type currencies, the currency is purchases with real money and can span multiple web sites, mobile sites, and/or apps, beyond those provided by the site server. These currencies can be exchanged and/or used in cross-publisher implementations. With experience-type currencies, experience points may be used for measuring a user's overall participation. According to some implementations, experience-type currencies do not decrease for a given user. With social-type currencies, social points may be used for measuring and rewarding community impact, such as reputation or influence. With skill-type currencies, skill points are used as a measure of a user's proficiency at some action associated with the site and/or app. In some implementations, multiple currency types may be associated with a given action. For example, when a user shares something, they may receive ten redeemable reward points (adding to their balance of points to use in a virtual gift store), one tracking point (to keep track of the number of times they share), and fifteen non-redeemable experience points (for their overall activity score).

In some implementations, the currency module may be configured to define unique-token-based support for idempotency. This may prevent a given API request by a given user from being replayed. In some implementations, a unique value (e.g., a globally unique identifier (GUID)) may be included in an API request signature. After that API request has succeeded, additional replays of the same API request may be disallowed.

The transaction module may be configured to define transactions of currency that occur responsive to user actions. The transaction module may be configured to allow the publisher of the site and/or app to specify a transaction title, a transaction description, a currency type for a given transaction, a default transaction amount, and/or other information associated with transactions. In accordance with some implementations, the transaction module may be configured to group defined transactions together so that multiple transactions are made responsive to a single user action.

According to some implementations, the transaction module may be configured to assign one or more nested transactions to a transaction group. Individual ones of the one or more nested transactions may be associated with one or more different currencies corresponding to a common user action. By way of non-limiting example, a given transaction group executed when a user leaves a comment on a website may include three nested transactions, which may be to provide comment points to the user, to provide participation points to the user, and to provide community impact points to the user. Thus, when a given user leaves a comment on the website, the entire transaction group is executed so that that user is provided comment points, participation points, and community impact points. In accordance with some implementations, individual nested transactions of a transaction group can be added, subtracted, and/or modified on-the-fly.

In some implementations, the entire transaction group may fail responsive to failure of one or more of the nested transactions assigned to the transaction group. To illustrate, by way of non-limiting example, a given transaction group executed when a user purchases a virtual good for another user may include three nested transactions, which may be to deduct ten virtual bucks from the user's account, to provide share points to the user, and to provide gift points to the user. If the user only has eight virtual bucks in his account, the entire transaction group may fail such that the user does not receive share points or virtual points because the first nested transaction failed due to insufficient funds in the user's account.

The transaction module may be configured to an end-user-cap and a time interval associated with individual transaction groups, according to some implementations. An end-user-cap may be a maximum number of times a given transaction group is valid for a given user within a corresponding time interval. The time interval may include an amount of time. In some implementations, the time interval may be infinite such that the end-user-cap is an absolute maximum number of times a given transaction group is valid for a given user.

The achievements editing module may be configured to create and/or edit achievements associated with the site and/or app. Achievements may be shown graphically by achievement representations. Achievement representations may include a distinctive badge, virtual token, emblem, and/or other graphic. Achievement representations may be displayed as an insignia of rank, office, and/or membership in an organization. The achievements editing module may be configured to allow the publisher to define one or more aspects of a given achievement. Exemplary aspects of achievements may include an achievement title, an achievement description, and/or other aspects of an achievement. By way of non-limiting example, achievements may be utilized to indicate stages of progress for a profile being completed, a level of accomplishment for any particular activity on a site and/or app, and/or other accomplishments of a user. The achievements editing module may be configured to determine an appearance of given achievement representations. In some implementations, images and/or other graphics used as achievement representations may be specified and/or uploaded by the publisher. Achievement representations may include a hyperlink to various content and/or sites.

The level groups module may be configured to define levels associated with the game mechanics of the site and/or app. Integration of levels into the site and/or app may encourage users to return to complete tasks, to achieve goals, and/or to perform other actions in the pursuit of the next level. The level groups module may be configured to allow the publisher to specify one or more aspects of individual levels. Exemplary aspects of a given level may include a level title, a level user title, a level description, a level user description, a currency associated with the given level, URLs associated with the given level, publisher defined attributes associated with the given level, and/or other aspects associated with levels. A level title may include a name of a level. A level user title may include a name of a level that is displayed to a user of the site and/or app. A level description may include a textual description of a level. A level user description may include a description of a level that is displayed to a user of the site and/or app. URLs associated with a level may reference images, an error or success page, and/or other information. Publisher defined attributes associated with a level may be used to classify analytics, drive logic, or filter objects.

In some implementations, the level groups module may be configured to define one or more quests, in accordance with some implementations. Individual ones of the one or more quests may include a set of tasks and/or segments configured to unlock one or more achievements upon completion of a defined number of tasks and/or segments. To illustrate, by way of non-limiting example, a site associated with a movie may have a quest including one or more tasks and/or segments. Those tasks and/or segments may include reading an article on the leading actor, reading an article on the leading actress, and completing a questionnaire associated with the movie. The tasks and/or segments may be performed in a predetermined sequent or in any order, according to various implementations. Once a user has completed all of the tasks and/or segments of the quest, a previously unavailable achievement may become available to or awarded to the user.

The award groups module may be configured to awards associated with the game mechanics of the site and/or app. An award may include one or more items granted as merited or due. Users may be given awards in certain scenarios defined by the publisher. The award groups module may be configured to allow the publisher to specify one or more aspects of individual awards. Exemplary aspects of a given award may include an award title, an award user title, an award description, an award user description, URLs associated with the given award, and/or other aspects associated with awards. An award title may include a name of an award. An award user title may include a name of an award that is displayed to a user of the site and/or app. An award description may include a textual description of an award. An award user description may include a description of an award that is displayed to a user of the site and/or app. URLs associated with an award may reference images, an error or success page, and/or other information.

The good groups module may be configured to define one or more virtual goods associated with the site and/or app. Virtual goods may include non-physical objects that are purchased, gifted, exchanged, and/or otherwise transacted for use in virtual environments (e.g., online communities and/or online games). Individual virtual goods may be assigned a relative weight for sorting or importance in relation to other virtual goods. The good groups module may be configured to allow the publisher to specify one or more aspects of individual virtual goods. Exemplary aspects of a given virtual good may include a good title, a good user title, a good description, a good user description, URLs associated with the given level, publisher defined attributes associated with the given level, and/or other aspects associated with levels. A good title may include a name of a virtual good. A good user title may include a name of a virtual good that is displayed to a user of the site and/or app. A good description may include a textual description of a virtual good. A good user description may include a description of a virtual good that is displayed to a user of the site and/or app. URLs associated with a virtual good may reference images, an error or success page, and/or other information. Publisher defined attributes associated with a virtual good may be used to classify analytics, drive logic, or filter objects.

The URL module may be configured to allow the publisher to define a URL associated with an object within the site and/or app. An object within the site and/or app may include an achievement and/or achievement representation, a level, an award, a virtual good, and/or other objects. The URL module may be configured to allow the publisher to specify whether a URL is associated with media. The URL module may be configured to allow the publisher to specify whether a URL is accessible by a user. The URL module may be configured to allow the publisher to specify one or more aspects of individual URLs. Exemplary aspects of a given URL may include URL title, URL user title, a URL description, a URL user description, publisher defined attributes associated with a URL, and/or other aspects associated with a URL. A URL title may include a name of a URL. A URL user title may include a name of a URL that is displayed to a user of the site and/or app. A URL description may include a textual description of a URL. A URL user description may include a description of a URL that is displayed to a user of the site and/or app. Publisher defined attributes associated with a URL may be used to classify analytics, drive logic, or filter objects.

The attributes module may be configured to allow the publisher to define one or more publisher defined attributes associated with objects within the site and/or app. Publisher defined attributes may be used as tags to allow the publisher to filter data associated with and/or stored in an API. Publisher defined attributes may be used to classify analytics, drive logic, or filter objects. The attributes module may be configured to allow the publisher to specify one or more aspects of individual publisher defined attributes. Exemplary aspects of a given publisher defined attribute may include an attribute title, an attribute user title, an attribute description, an attribute user description, an attribute friendly ID, and/or other aspects associated with an attribute. An attribute title may include a name of an attribute. An attribute user title may include a name of an attribute that is displayed to a user of the site and/or app. An attribute description may include a textual description of an attribute. An attribute user description may include a description of an attribute that is displayed to a user of the site and/or app. An attribute friendly ID may include a reference identification associated with an object that is distinguishable from the corresponding object title.

The analytics modules may be configured to provide various reports on analytics associated with the game mechanics of the site and/or app. These reports may be utilized by the publisher to, among other things, track site and/or app usage, make decisions on modifications to the game mechanics, and/or to perform other maintenance and/or development actions associated with the site and/or app. The reports may include textual data, graphical data, and/or other data representations. In some implementations, one or more of the analytics modules continuously and/or periodically aggregates data associated with the publisher to generate new reports and/or update existing reports.

The temporal reports module may be configured to provide reports on various analytics on a temporal basis (e.g., by day or by hour by day). The reports may include information indicative of points per time period, number of active users per time period, virtual goods transacted per time period, and/or other information indicative of time-based analytics. The temporal reports module may be configured to specify a time period of interest, a currency, whether the analytics are from a source or a sink, and/or other factors associated with time-based analytics of the game mechanics of the site and/or app.

The API reports module may be configured to provide reports on analytics associated with API requests. The API reports module may be configured to allow the publisher to specify a time period of the reports, a request method of the API requests, and/or other information associated with API requests.

The awards reports module may be configured to provide reports on analytics associated with individual awards and/or groups of awards. The reports may provide information indicative of a number of users that have obtained a given award and/or a given group of awards, an average number of awards per user, and/or other information associated with individual awards and/or groups of awards. The reports may segregate information based on user demographics. The reports may provide information on a temporal basis.

The goods reports module may be configured to provide reports on analytics associated with individual virtual goods and/or groups of virtual goods. The reports may provide information indicative of a number of users that have obtained a given virtual goods and/or a given group of virtual goods, an average number of virtual goods per user, and/or other information associated with individual virtual goods and/or groups of virtual goods. The reports may segregate information based on user demographics. The reports may provide information on a temporal basis.

The level reports module may be configured to provide reports on analytics associated with individual levels and/or groups of levels. The reports may provide information indicative of a number of users by level for a current level, a number of users by level collection for a current level, a number of users by level for all levels granted, a number of users by level collection for all levels granted, a trend of users by level for a current level, a trend of users by level collection for a current level, a trend of users by level for all levels granted, a trend of users by level collection for all levels granted, and/or other information associated with individual levels and/or groups of levels. The reports may segregate information based on user demographics. The reports may provide information on a temporal basis.

The points reports module may be configured to provide reports on analytics associated with points of individual users and/or groups of users. The reports may provide information indicative of a number of points obtained by individual users and/or groups of users, an average number of points per user, and/or other information associated with points of individual users and/or groups of users. The reports may segregate information based on user demographics. The reports may provide information on a temporal basis.

The user reports module may be configured to provide reports on analytics associated with a number of active users on a temporal basis (e.g., by day or by hour by day). The publisher may refine the analytics based on currency, whether the analytics are from a source or sink, a currency, a specific time period, and/or other metrics associated with active users.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Implementations of the present technology provide a self-serve approach for incorporating game mechanics with an existing or new web site, mobile site, and/or app. Game mechanics may be incorporated into a web site, mobile site, and/or app using a self-serve application programming interface (API) tool, in accordance with some implementations. At a gamification server, a user interface may be generated for a user visiting a site and/or app provided by a site server. In some implementations, a widget and/or other graphical control element may be generated that is configured to serve as such a user interface. The user interface may be configured to be incorporated with the site and/or app. The gamification server may be separate and distinct from the site server. An economy may be defined at the gamification server that governs game mechanics associated with the user interface. The economy may be based on and/or include business rules and/or logic. The user interface may be provided for integration with the site and/or app. Integration of the user interface with the site and/or app may provide the game mechanics to the site and/or app. In some implementations, the user interface may be generated based on input provided by or on behalf of a publisher of a site and/or app.

Figure 1:
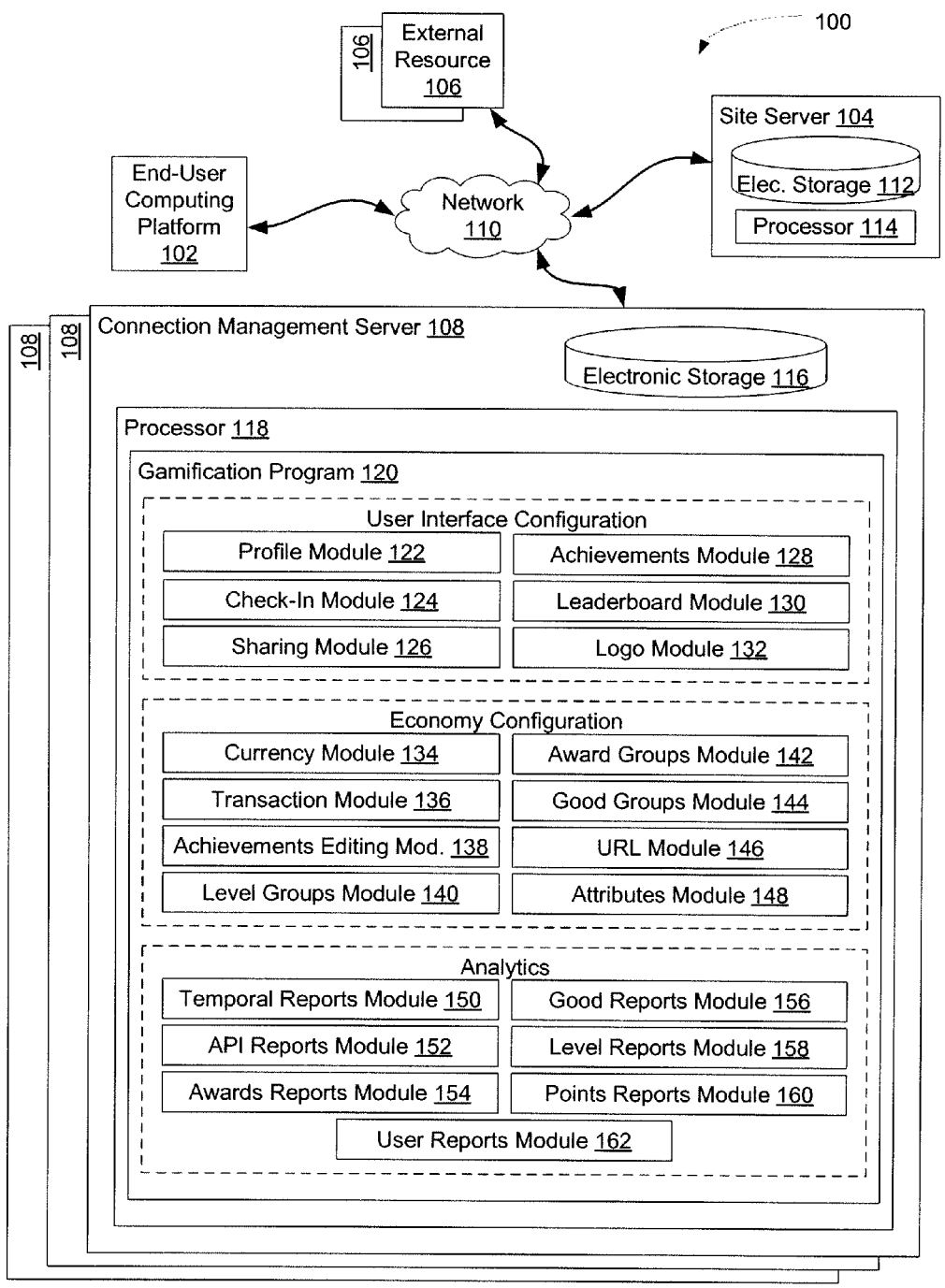
FIG. 1 illustrates a system for incorporating game mechanics with a web site, mobile site, and/or app using a self-serve application programming interface (API) tool, in accordance with one or more implementations.

FIG. 1 illustrates a system 100 for incorporating game mechanics with a web site, mobile site, and/or app using a self-serve application programming interface (API) tool, in accordance with one or more implementations. As depicted in FIG. 1, the system 100 may include at least one end-user computing platform 102, a site server 104, external resources 106, a gamification server 108, and/or other components, all being in communication via a network 110. It will be appreciated that the description of the system 100 herein including servers 104 and/or 108 is not intended to be limiting. The inclusion and/or configuration of the individual servers 104 and/or 108 are provided solely by way of non-limiting example. The system 100 may be configured without one or more of servers 104 and/or 108. In such configurations, some or all of the functionality attributed to the omitted server(s) may be provided by one or more of the other servers, one or more servers external to the system 100, and/or by other processing and/or storage resources. In some implementations, the system 100 may include one or more additional servers. Such servers may provide some or all of the functionality attributed herein to one or more of servers 104 and/or 108, and/or other functionality.

The site server 104 may be configured to host a web site, mobile site, and/or app accessible by the end-user computing platform 102. Such a site and/or app may facilitate online commerce, media presentation, and/or other functions associated with web sites, mobile sites, and/or apps. The site server 104 may be configured to provide one or more apps accessible and/or executable by the end-user computing platform 102. The term "app" may generically describe a web-based application tailored to specific client computing platform form factors and user interfaces.

The gamification server 108 may be configured to provide a self-serve application programming interface that allows a publisher of a web site, mobile site, and/or app to incorporate game mechanics with the site(s) and/or app(s).

The gamification server 108 may be configured to execute a gamification program 120. The gamification program 120 may be configured to provide a self-serve application programming interface tool that allows a publisher of a web site, mobile site, and/or app to incorporate game mechanics with the site(s) and/or apps. The gamification program 120 may be configured to operate in concert with the site server 104 and/or with sites and/or apps provided by the site server 104.

According to some implementations, a publisher of a site (e.g., a web site and/or a mobile site) and/or app provided by the site server 104 may access the gamification server 108 via the network 110 to manipulate one or more modules of the gamification program 120. The gamification server 108 may provide a site and/or app to facilitate interactions between the publisher and the gamification program 120. Actions performed by the publisher with the gamification program 120 may affect one or more game mechanics and/or other features of the site and/or app in real time, near-real time, and/or at another time. In some implementations, the gamification program 120 may provide a live representation of the site and/or app to the publisher so changes and/or modifications made to the game mechanics of the site and/or app are viewable in real time.

The gamification program 120 may include one or more computer program modules and/or instructions that may be executed by the gamification server 108. The one or more computer program modules may include one or more of user interface configuration modules, economy configuration modules, analytics modules, and/or other modules. The user interface configuration modules may include one or more of a profile module 122, a check-in module 124, a sharing module 126, an achievements module 128, a leaderboard module 130, a logo module 132, and/or other modules. The economy configuration modules may include one or more of a currency module 134, an achievements editing module 138, a transaction module 136, a level groups module 140, an award groups module 142, a good groups module 144, a URL module 146, an attributes module 148, and/or other modules. The analytics modules may include one or more of temporal reports module 150, an API reports module 152, an awards reports module 154, a goods reports module 156, a level reports module 158, a points reports module 160, a user reports module 162, and/or other modules.

The user interface configuration modules may be configured to generate and maintain a user interface that can be incorporated with a site (e.g., a web site and/or a mobile site) and/or app provided by the site server 104. The user interface may serve as a graphical interface for a user visiting the site and/or utilizing the app. For example, the user interface may allow the user to track progress and/or other aspects of associated with the game mechanics offered by the site and/or app. Once the user interface is generated at the gamification server 108, the user interface may be provided for integration with the site and/or app. Integration of the user interface with the site and/or app may provide game mechanics to the site and/or app. According to some implementations, providing the user interface for integration with the site and/or app may include providing, to the publisher, code corresponding to the user interface for insertion into code for the site and/or app. It is noteworthy that, in some implementations, the user interface may be provided by an interface other than a user interface. In some embodiments, API calls may be authenticated by one or more of the user interface configuration modules. Such authentication may be performed via one or more encrypted communication channels associated with the gamification server 108, the site server 104, and/or other components of the system.

The profile module 122 may be configured to allow users to sign into the user interface and/or the site and/or app via a third-party account. By way of non-limiting example, a user may sign into the user interface and/or the site and/or app via their Facebook™ account using a Facebook™ Connect feature associated with the gamification server 108. The profile module 122 may be configured to provide, for presentation to a user, analytics associated with the game mechanics of the site and/or app. The profile module 122 may allow the publisher may select one or more achievement representations that are viewable from the user interface. Achievement representations are described in further detail in connection with the achievements editing module 138. The profile module 122 may allow the publisher may select a count to be viewable from the user interface for individual ones of viewable achievement representations.

The check-in module 124 may be configured to allow the publisher of the site and/or app to select whether to enable the user interface to reward users that check in to the user interface and/or the site and/or app. The check-in module 124 may be configured to allow users, by checking in, to show that they have visited the site and/or utilized the app. Visiting the site and/or utilizing the app may allow users to earn points for repeat visits and/or utilizations.

The sharing module 126 may be configured to allow the publisher of the site and/or app to select whether to enable the user interface to reward users that share content. The sharing module 126 may be configured to allow users to earn points for sharing content and/or links to pages on the site and/or app. In some implementations, the sharing module 126 may be configured to allow users to earn points for visitors that visit the site by following shared links.

The achievements module 128 may be configured to allow the publisher to select whether to enable the user interface from displaying representations of which achievements a user has earned and/or which available achievements the user has not earned. The achievements module 128 may be configured to provide a button, icon, and/or other selectable graphic that allows a user to display one or more available achievements.

The leaderboard module 130 may be configured to allow the publisher and/or a user to select whether to enable the user interface from displaying a leaderboard. A leaderboard may be a board or list on which the currencies, points, and/or scores of one or more leading users are displayed. The leaderboard module 130 may be configured to allow the publisher and/or a user to select one or more metrics reflected by the leaderboard. Examples of such metrics may include counters associated with achievements and/or other statistics associated with the game mechanics of the site and/or app. The leaderboard module 130 may be configured to allow the publisher and/or a user to select a type of leaderboard to be displayed by the user interface. Types of leaderboards may include a "top-ten" leaderboard, a leaderboard relative to a user, and/or other formats for leaderboards. According to some implementations, a top ten leaderboard may display the top users, while a relative-to-user leaderboard may display a given user's current rank and three users above and six users below the given user's current rank.

The logo module 132 may be configured to allow the publisher of the site and/or app to select a logo and/or other graphics to be displayed by the user interface. In some implementations, the publisher can upload a graphic and/or provide a URL to a graphic. The logo module 132 may be configured to scale graphics provided by the publisher so that the graphics display in a predetermined space within the user interface. A logo and/or other graphic may include a hyperlink to various content and/or site and/or apps.

The economy configuration modules may be configured to define and/or modify an economy governing the game mechanics of the site and/or app. The economy includes the exchange and consumption of virtual and/or real goods and services using currency and loyalty points by utilizing game mechanics. In exemplary implementations, this may create user engagement, incentivize virality, and/or enable user monetization.

The currency module 134 may be configured to define one or more aspects of one or more currencies used in conjunction with the site and/or app. In some implementations, currency and "points" may be one and the same. A currency may operate as a counter that counts user actions, a point system, a true virtual currency for purchase transactions, and/or a tracking system for other actions in the economy. Examples of aspects of a currency that may be defined by the currency module 134 include a currency title, currency type, a currency description, an exchange rate, and/or other aspects of the currency. The currency title may be the name of the currency as determined by the publisher. The currency description may include a textual description for the currency as provided by the publisher. The currency exchange rate may be a ratio at which a unit of currency defined by the currency module 134 can be exchanged for real currency (e.g., U.S. dollars).

The currency type of a given currency may include redeemable, non-redeemable, purchase, hybrid, reward, über, experience, social, skill, and/or another type of currency. The currency type may be selected based on how the currency is utilized by the site and/or app. With redeemable-type currencies, users will be able to exchange the currency for virtual gifts and goods, content access, and/other virtual and real items and services. With non-redeemable-type currencies, points associated with a user may be added or deducted, but the currency will not be exchangeable for virtual or real items and/or services. With purchase-type currencies, users are only able to gain the currency by buying it with real money. The exchange rate may be established by the publisher via the currency module 134. With hybrid-type currencies, users may be rewarded with the currency as well as purchase it with real money. With reward-type currencies, the currency is given away to users who perform actions valued by the publisher of the site and/or app. With über-type currencies, the currency is purchases with real money and can span multiple web sites, mobile sites, and/or apps, beyond those provided by the site server 104. These currencies can be exchanged and/or used in cross-publisher implementations. With experience-type currencies, experience points may be used for measuring a user's overall participation. According to some implementations, experience-type currencies do not decrease for a given user. With social-type currencies, social points may be used for measuring and rewarding community impact, such as reputation or influence. With skill-type currencies, skill points are used as a measure of a users proficiency at some action associated with the site and/or app. In some implementations, multiple currency types may be associated with a given action. For example, when a user shares something, they may receive ten redeemable reward points (adding to their balance of points to use in a virtual gift store), one tracking point (to keep track of the number of times they share), and fifteen non-redeemable experience points (for their overall activity score).

In some implementations, the currency module 134 may be configured to define unique-token-based support for idempotency. This may prevent a given API request by a given user from being replayed. In some implementations, a unique value (e.g., a globally unique identifier (GUID)) may be included in an API request signature. After that API request has succeeded, additional replays of the same API request may be disallowed.

The transaction module 136 may be configured to define transactions of currency that occur responsive to user actions. The transaction module 136 may be configured to allow the publisher of the site and/or app to specify a transaction title, a transaction description, a currency type for a given transaction, a default transaction amount, and/or other information associated with transactions. In accordance with some implementations, the transaction module 136 may be configured to group defined transactions together so that multiple transactions are made responsive to a single user action.

According to some implementations, the transaction module 136 may be configured to assign one or more nested transactions to a transaction group. Individual ones of the one or more nested transactions may be associated with one or more different currencies corresponding to a common user action. By way of non-limiting example, a given transaction group executed when a user leaves a comment on a website may include three nested transactions, which may be to provide comment points to the user, to provide participation points to the user, and to provide community impact points to the user. Thus, when a given user leaves a comment on the website, the entire transaction group is executed so that that user is provided comment points, participation points, and community impact points. In accordance with some implementations, individual nested transactions of a transaction group can be added, subtracted, and/or modified on-the-fly.

In some implementations, the entire transaction group may fail responsive to failure of one or more of the nested transactions assigned to the transaction group. To illustrate, by way of non-limiting example, a given transaction group executed when a user purchases a virtual good for another user may include three nested transactions, which may be to deduct ten virtual bucks from the user's account, to provide share points to the user, and to provide gift points to the user. If the user only has eight virtual bucks in his account, the entire transaction group may fail such that the user does not receive share points or virtual points because the first nested transaction failed due to insufficient funds in the user's account.

The transaction module 136 may be configured to an end-user-cap and a time interval associated with individual transaction groups, according to some implementations. An end-user-cap may be a maximum number of times a given transaction group is valid for a given user within a corresponding time interval. The time interval may include an amount of time. In some implementations, the time interval may be infinite such that the end-user-cap is an absolute maximum number of times a given transaction group is valid for a given user.

The achievements editing module 138 may be configured to create and/or edit achievements associated with the site and/or app. Achievements may be shown graphically by achievement representations. Achievement representations may include a distinctive badge, virtual token, emblem, and/or other graphic. Achievement representations may be displayed as an insignia of rank, office, and/or membership in an organization. The achievements editing module 138 may be configured to allow the publisher to define one or more aspects of a given achievement. Exemplary aspects of achievements may include an achievement title, an achievement description, and/or other aspects of an achievement. By way of non-limiting example, achievements may be utilized to indicate stages of progress for a profile being completed, a level of accomplishment for any particular activity on a site and/or app, and/or other accomplishments of a user. The achievements editing module 138 may be configured to determine an appearance of given achievement representations. In some implementations, images and/or other graphics used as achievement representations may be specified and/or uploaded by the publisher. Achievement representations may include a hyperlink to various content and/or sites and/or apps.

The level groups module 140 may be configured to define levels associated with the game mechanics of the site and/or app. Integration of levels into the site and/or app may encourage users to return to complete tasks, to achieve goals, and/or to perform other actions in the pursuit of the next level. The level groups module 140 may be configured to allow the publisher to specify one or more aspects of individual levels. Exemplary aspects of a given level may include a level title, a level user title, a level description, a level user description, a currency associated with the given level, URLs associated with the given level, publisher defined attributes associated with the given level, and/or other aspects associated with levels. A level title may include a name of a level. A level user title may include a name of a level that is displayed to a user of the site and/or app. A level description may include a textual description of a level. A level user description may include a description of a level that is displayed to a user of the site and/or app. URLs associated with a level may reference images, an error or success page, and/or other information. Publisher defined attributes associated with a level may be used to classify analytics, drive logic, or filter objects.

In some implementations, the level groups module 140 may be configured to define one or more quests, in accordance with some implementations. Individual ones of the one or more quests may include a set of tasks and/or segments configured to unlock one or more achievements upon completion of a defined number of tasks and/or segments. To illustrate, by way of non-limiting example, a site associated with a movie may have a quest including one or more tasks and/or segments. Those tasks and/or segments may include reading an article on the leading actor, reading an article on the leading actress, and completing a questionnaire associated with the movie. The tasks and/or segments may be performed in a predetermined sequent or in any order, according to various implementations. Once a user has completed all of the tasks and/or segments of the quest, a previously unavailable achievement may become available to or awarded to the user.

The award groups module 142 may be configured to awards associated with the game mechanics of the site and/or app. An award may include one or more items granted as merited or due. Users may be given awards in certain scenarios defined by the publisher. The award groups module 142 may be configured to allow the publisher to specify one or more aspects of individual awards. Exemplary aspects of a given award may include an award title, an award user title, an award description, an award user description, URLs associated with the given award, and/or other aspects associated with awards. An award title may include a name of an award. An award user title may include a name of an award that is displayed to a user of the site and/or app. An award description may include a textual description of an award. An award user description may include a description of an award that is displayed to a user of the site and/or app. URLs associated with an award may reference images, an error or success page, and/or other information.

The good groups module 144 may be configured to define one or more virtual goods associated with the site and/or app. Virtual goods may include non-physical objects that are purchased, gifted, exchanged, and/or otherwise transacted for use in virtual environments (e.g., online communities and/or online games). Individual virtual goods may be assigned a relative weight for sorting or importance in relation to other virtual goods. The good groups module 144 may be configured to allow the publisher to specify one or more aspects of individual virtual goods. Exemplary aspects of a given virtual good may include a good title, a good user title, a good description, a good user description, URLs associated with the given level, publisher defined attributes associated with the given level, and/or other aspects associated with levels. A good title may include a name of a virtual good. A good user title may include a name of a virtual good that is displayed to a user of the site and/or app. A good description may include a textual description of a virtual good. A good user description may include a description of a virtual good that is displayed to a user of the site and/or app. URLs associated with a virtual good may reference images, an error or success page, and/or other information. Publisher defined attributes associated with a virtual good may be used to classify analytics, drive logic, or filter objects.

The URL module 146 may be configured to allow the publisher to define a URL associated with an object within the site and/or app. An object within the site and/or app may include an achievement and/or achievement representation, a level, an award, a virtual good, and/or other objects. The URL module 146 may be configured to allow the publisher to specify whether a URL is associated with media. The URL module 146 may be configured to allow the publisher to specify whether a URL is accessible by a user. The URL module 146 may be configured to allow the publisher to specify one or more aspects of individual URLs. Exemplary aspects of a given URL may include URL title, URL user title, a URL description, a URL user description, publisher defined attributes associated with a URL, and/or other aspects associated with a URL. A URL title may include a name of a URL. A URL user title may include a name of a URL that is displayed to a user of the site and/or app. A URL description may include a textual description of a URL. A URL user description may include a description of a URL that is displayed to a user of the site and/or app. Publisher defined attributes associated with a URL may be used to classify analytics, drive logic, or filter objects.

The attributes module 148 may be configured to allow the publisher to define one or more publisher defined attributes associated with objects within the site and/or app. Publisher defined attributes may be used as tags to allow the publisher to filter data associated with and/or stored in an API. Publisher defined attributes may be used to classify analytics, drive logic, or filter objects. The attributes module 148 may be configured to allow the publisher to specify one or more aspects of individual publisher defined attributes. Exemplary aspects of a given publisher defined attribute may include an attribute title, an attribute user title, an attribute description, an attribute user description, an attribute friendly ID, and/or other aspects associated with an attribute. An attribute title may include a name of an attribute. An attribute user title may include a name of an attribute that is displayed to a user of the site and/or app. An attribute description may include a textual description of an attribute. An attribute user description may include a description of an attribute that is displayed to a user of the site and/or app. An attribute friendly ID may include a reference identification associated with an object that is distinguishable from the corresponding object title.

The analytics modules may be configured to provide various reports on analytics associated with the game mechanics of the site and/or app. These reports may be utilized by the publisher to, among other things, track site and/or app usage, make decisions on modifications to the game mechanics, and/or to perform other maintenance and/or development actions associated with the site and/or app. The reports may include textual data, graphical data, and/or other data representations. In some implementations, one or more of the analytics modules continuously and/or periodically aggregates data associated with the publisher to generate new reports and/or update existing reports.

The temporal reports module 150 may be configured to provide reports on various analytics on a temporal basis (e.g., by day or by hour by day). The reports may include information indicative of points per time period, number of active users per time period, virtual goods transacted per time period, and/or other information indicative of time-based analytics. The temporal reports module 150 may be configured to specify a time period of interest, a currency, whether the analytics are from a source or a sink, and/or other factors associated with time-based analytics of the game mechanics of the site and/or app.

The API reports module 152 may be configured to provide reports on analytics associated with API requests. The API reports module 152 may be configured to allow the publisher to specify a time period of the reports, a request method of the API requests, and/or other information associated with API requests.

The awards reports module 154 may be configured to provide reports on analytics associated with individual awards and/or groups of awards. The reports may provide information indicative of a number of users that have obtained a given award and/or a given group of awards, an average number of awards per user, and/or other information associated with individual awards and/or groups of awards. The reports may segregate information based on user demographics. The reports may provide information on a temporal basis.

The goods reports module 156 may be configured to provide reports on analytics associated with individual virtual goods and/or groups of virtual goods. The reports may provide information indicative of a number of users that have obtained a given virtual goods and/or a given group of virtual goods, an average number of virtual goods per user, and/or other information associated with individual virtual goods and/or groups of virtual goods. The reports may segregate information based on user demographics. The reports may provide information on a temporal basis.

The level reports module 158 may be configured to provide reports on analytics associated with individual levels and/or groups of levels. The reports may provide information indicative of a number of users by level for a current level, a number of users by level collection for a current level, a number of users by level for all levels granted, a number of users by level collection for all levels granted, a trend of users by level for a current level, a trend of users by level collection for a current level, a trend of users by level for all levels granted, a trend of users by level collection for all levels granted, and/or other information associated with individual levels and/or groups of levels. The reports may segregate information based on user demographics. The reports may provide information on a temporal basis.

The points reports module 160 may be configured to provide reports on analytics associated with points of individual users and/or groups of users. The reports may provide information indicative of a number of points obtained by individual users and/or groups of users, an average number of points per user, and/or other information associated with points of individual users and/or groups of users. The reports may segregate information based on user demographics. The reports may provide information on a temporal basis.

The user reports module 162 may be configured to provide reports on analytics associated with a number of active users on a temporal basis (e.g., by day or by hour by day). The publisher may refine the analytics based on currency, whether the analytics are from a source or sink, a currency, a specific time period, and/or other metrics associated with active users.

The end-user computing platform 102, the site server 104, the external resources 106, the gamification server 108, and/or other components of the system 100 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which the end-user computing platform 102, the site server 104, the external resources 106, the gamification server 108, and/or other components of the system 100 may be operatively linked via some other communication media.

The end-user computing platform 102 may include one or more processors configured to execute computer program modules. The computer program modules may be configured to enable one or more users associated with the end-user computing platform 102 to interface with the system 100, the site server 104, the external resources 106, the gamification server 108, and/or other components, and/or provide other functionality attributed herein to the end-user computing platform 102. By way of non-limiting example, the end-user computing platform 102 may include one or more of a desktop computer, a laptop computer, a handheld computer, a NetBook, a Smartphone, and/or other computing platforms.

The site server 104 may include electronic storage 112, one or more processors 114, and/or other components. The site server 104 may include communication lines or ports to enable the exchange of information with a network and/or other computing platforms. Illustration of site server 104 in FIG. 1 is not intended to be limiting. The site server 104 may include a plurality of hardware, software, and/or firmware components operating together to provide the functionality attributed herein to the site server 104. For example, site server 104 may be implemented by a cloud of computing platforms operating together as site server 104.

The electronic storage 112 may comprise electronic storage media that electronically stores information. The electronic storage media of the electronic storage 112 may include one or both of system storage that is provided integrally (i.e., substantially non-removable) with the site server 104 and/or removable storage that is removably connectable to the site server 104 via, for example, a port (e.g., a USB port, a firewire port, etc.) or a drive (e.g., a disk drive, etc.). The electronic storage 112 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 112 may store software algorithms, information determined by processor(s) 114, information received from the end-user computing platform 102, the external resources 106, the gamification server 108, and/or other information that enables the site server 104 to function as described herein.

The processor(s) 114 may be configured to provide information processing capabilities in the site server 104. As such, the processor(s) 114 may include one or more of a digital processor, an analog processor, a digital circuit designed to process information, an analog circuit designed to process information, a state machine, and/or other mechanisms for electronically processing information. The processor(s) 114 may be configured to execute programs, modules, instructions, and/or other executable information to effectuate functionalities described herein. Although the processor(s) 114 is shown in FIG. 1 as a single entity, this is for illustrative purposes only. In some implementations, the processor(s) 114 may include a plurality of processing units. These processing units may be physically located within the same device, or the processor(s) 114 may represent processing functionality of a plurality of devices operating in coordination.

The external resources 106 may include sources of information, hosts and/or providers of web sites and/or services outside of the system 100, external entities participating with the system 100, and/or other resources. In some implementations, the external resources 106 may include social networking web sites, content providers, and/or other resources. Some or all of the functionality attributed herein to the external resources 106 may be provided by resources included in the system 100.

The gamification server 108 may include electronic storage 116, one or more processors 118, and/or other components. The gamification server 108 may include communication lines or ports to enable the exchange of information with a network and/or other computing platforms. Illustration of the gamification server 108 in FIG. 1 is not intended to be limiting. The gamification server 108 may include a plurality of hardware, software, and/or firmware components operating together to provide the functionality attributed herein to the gamification server 108. For example, the gamification server 108 may be implemented by a cloud of computing platforms operating together as gamification server 108.

The electronic storage 116 may comprise electronic storage media that electronically stores information. The electronic storage media of the electronic storage 116 may include one or both of system storage that is provided integrally (i.e., substantially non-removable) with the gamification server 108 and/or removable storage that is removably connectable to the gamification server 108 via, for example, a port (e.g., a USB port, a firewire port, etc.) or a drive (e.g., a disk drive, etc.). The electronic storage 116 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 116 may store software algorithms, information determined by processor(s) 118, information received from the end-user computing platform 102, the site server 104, the external resources 106, and/or other information that enables the gamification server 108 to function as described herein.

The processor(s) 118 may be configured to provide information processing capabilities in the gamification server 108. As such, the processor(s) 118 may include one or more of a digital processor, an analog processor, a digital circuit designed to process information, an analog circuit designed to process information, a state machine, and/or other mechanisms for electronically processing information. Although the processor(s) 118 is shown in FIG. 1 as a single entity, this is for illustrative purposes only. In some implementations, the processor(s) 118 may include a plurality of processing units. These processing units may be physically located within the same device, or the processor(s) 118 may represent processing functionality of a plurality of devices operating in coordination. The processor(s) 118 may be configured to execute the gamification program 120, and/or modules 122, 124, 126, 128, 130, 132, 134, 136, 138, 140, 142, 144, 146, 148, 150, 152, 154, 156, 158, 160, 162, and/or other modules. The processor(s) 118 may be configured to execute the gamification program 120, and/or modules 122, 124, 126, 128, 130, 132, 134, 136, 138, 140, 142, 144, 146, 148, 150, 152, 154, 156, 158, 160, and/or 162 by software; hardware; firmware; some combination of software, hardware, and/or firmware; and/or other mechanisms for configuring processing capabilities on the processor(s) 118.

It should be appreciated that although modules 122, 124, 126, 128, 130, 132, 134, 136, 138, 140, 142, 144, 146, 148, 150, 152, 154, 156, 158, 160, and 162 are illustrated in FIG. 1 as being co-located within a single processing unit, in implementations in which the processor(s) 118 includes multiple processing units, one or more of modules 122, 124, 126, 128, 130, 132, 134, 136, 138, 140, 142, 144, 146, 148, 150, 152, 154, 156, 158, 160, and/or 162 may be located remotely from the other modules. The description of the functionality provided by the different modules 122, 124, 126, 128, 130, 132, 134, 136, 138, 140, 142, 144, 146, 148, 150, 152, 154, 156, 158, 160, and/or 162 described below is for illustrative purposes, and is not intended to be limiting, as any of modules 122, 124, 126, 128, 130, 132, 134, 136, 138, 140, 142, 144, 146, 148, 150, 152, 154, 156, 158, 160, and/or 162 may provide more or less functionality than is described. For example, one or more of modules 122, 124, 126, 128, 130, 132, 134, 136, 138, 140, 142, 144, 146, 148, 150, 152, 154, 156, 158, 160, and/or 162 may be eliminated, and some or all of its functionality may be provided by other ones of modules 122, 124, 126, 128, 130, 132, 134, 136, 138, 140, 142, 144, 146, 148, 150, 152, 154, 156, 158, 160, and/or 162. As another example, the processor(s) 118 may be configured to execute one or more additional modules that may perform some or all of the functionality attributed below to one of modules 122, 124, 126, 128, 130, 132, 134, 136, 138, 140, 142, 144, 146, 148, 150, 152, 154, 156, 158, 160, and/or 162.

Figure 2:
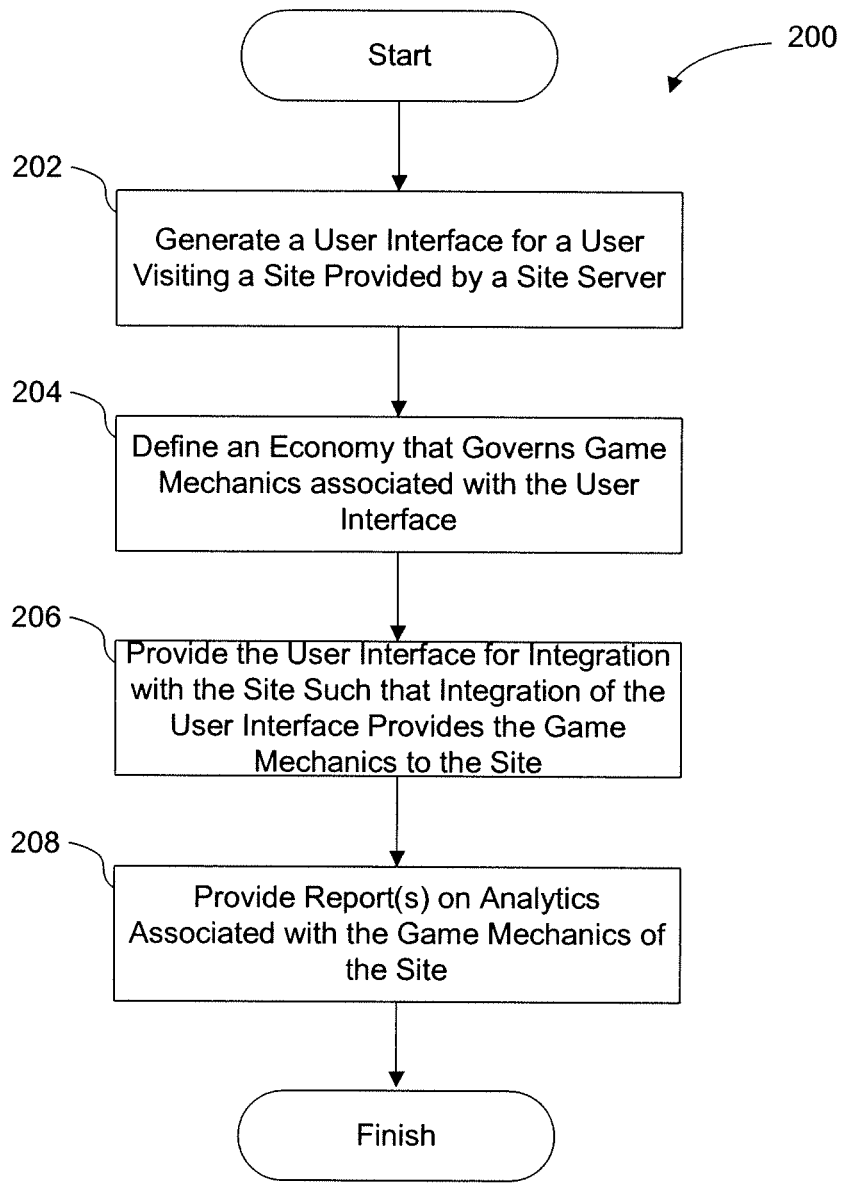
FIG. 2 is a flowchart illustrating a method for incorporating game mechanics into a web site, mobile site, and/or app using a self-serve application programming interface (API) tool, in accordance with one or more implementations.

FIG. 2 is a flowchart illustrating a method 200 for incorporating game mechanics into a web site, mobile site, and/or app using a self-serve application programming interface (API) tool, in accordance with one or more implementations. The operations of the method 200 presented below are intended to be illustrative. In some implementations, the method 200 may be accomplished with one or more additional operations not described, and/or without one or more of the operations discussed. Additionally, the order in which the operations of the method 200 are illustrated in FIG. 2 and described below is not intended to be limiting.

In some implementations, the method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the method 200 in response to instructions stored electronically on an electronic storage medium. The one or more processing devices may include one or more devices configured through hardware, firmware, and/or software to be specifically designed for execution of one or more of the operations of the method 200.

At operation 202, a user interface may be generated at a gamification server for a user visiting a site and/or app provided by a site server. The user interface may be configured to be incorporated with the site and/or app. The gamification server may be separate and distinct from the site server. In accordance with one or more implementations, operation 202 may be performed by one or more of the profile module 122, the check-in module 124, the sharing module 126, the achievements module 128, the leaderboard module 130, or the logo module 132.

At operation 204, an economy may be defined at the gamification server that governs game mechanics associated with the user interface. In accordance with one or more implementations, operation 204 may be performed by one or more of the currency module 134, the transaction module 136, the achievements editing module 138, the level groups module 140, the award groups module 142, the good groups module 144, the URL module 146, or the attributes module 148.

At operation 206, the user interface may be provided for integration with the site and/or app. Integration of the user interface with the site and/or app may provide the game mechanics to the site and/or app. According to one or more implementations, providing the user interface for integration with the site and/or app may include providing, to the publisher associated with the site and/or app, code corresponding to the user interface for insertion into code for the site and/or app. Operation 206 may be performed by way of execution of the gamification program 120.

At operation 208, one or more reports may be provided at the gamification server on analytics associated with the game mechanics of the site and/or app provided by the site server. In accordance with one or more implementations, operation 208 may be performed by one or more of the temporal reports module 150, the API reports module 152, the awards reports module 154, the goods reports module 156, the level reports module 158, the points reports module 160, or the user reports module 162.

In some implementations, the method 200 may be implemented with use of one or more widgets and/or other graphical interface elements. In such implementations, the one or more widgets and/or other graphical interface elements may be generated based on input provided by or on behalf of a publisher of a site and/or app. The one or more widgets and/or other graphical interface elements may be configured to be incorporated with the site and/or app. An economy governing game mechanics associated with the one or more widgets and/or other graphical interface elements may be defined. The one or more widgets and/or other graphical interface elements may be provided for integration with the site and/or app. Integration of the one or more widgets and/or other graphical interface elements with the site and/or app may provide the game mechanics to the site and/or app. According to some implementations, the method 200 may include receiving information associated with a user interface incorporated within a site and/or app, and storing the information within one or more computer-readable storage media. Such computer-readable storage media may be located within one or more components of the system 100.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any implementation can be combined with one or more features of any other implementation.

What is claimed is:

1. A computer-implemented method for incorporating game mechanics into a web site, mobile site, and/or app using an automated access, self-serve application programming interface (API), the method being performed by one or more physical processors included in a server configured to execute computer program instructions, the method comprising:
    hosting, using the one or more physical processors, the site and/or app configured for user interaction via a client computing platform, the site and/or app being associated with a publisher of the site and/or app, the site and/or app being a non-game application, wherein a user associated with the client computing platform interacts with the site and/or app through views generated by the client computing platform from information received from the server, and wherein the user performs one or more actions within the site and/or app through input entered to the site and/or app on the client computing platform;
    generating, using the one or more physical processors, one or more API calls to a remote gamification server, the gamification server being physically separate and distinct from the server, the one or more API calls indicating the one or more actions of the user; and
    effectuating, using the one or more physical processors, presentation of a user interface within views of the site and/or app generated by the client computing platform, the user interface including gamification analytics generated at the gamification server based on the one or more API calls, the gamification analytics being associated with one or more game mechanics, wherein the game mechanics determine a correspondence between the one or more user actions and the gamification analytics, and wherein integration of the user interface within views of the site and/or app provides the game mechanics to the site and/or app such that the one or more actions of the user within the site and/or app are incentivized by the game mechanics.

2. The method of claim 1, wherein effectuating presentation of the user interface includes obtaining, using the one or more physical processors, code corresponding to the user interface for insertion into code for the site and/or app.

3. The method of claim 1, wherein effectuating presentation of the user interface includes obtaining, using the one or more physical processors, the user interface generated at the gamification server, wherein generating the user interface includes generating, at the gamification server, one or more widgets configured to provide the user interface.

4. The method of claim 3, wherein providing one or more widgets for integration with the site and/or app includes obtaining, using the one or more physical processors, code corresponding to individual ones of the one or more widgets for insertion into code for the site and/or app.

5. The method of claim 3, further comprising:
    providing, using the one or more physical processors, a selection of one or more achievement representations that are viewable from individual ones of the one or more widgets to the gamification server, individual ones of the one or more achievement representations corresponding to achievements, wherein providing the selection facilitates the generation, at the gamification server, of the one or more widgets.

6. The method of claim 3, further comprising:
    providing, using the one or more physical processors, a selection as to whether to enable individual ones of the one or more widgets to reward users of the site and/or app that check in to individual ones of the one or more widgets and/or the site and/or app when the one or more widgets are integrated with the site and/or app to the gamification server, wherein providing the selection facilitates the generation, at the gamification server, of the one or more widgets.

7. The method of claim 3, further comprising:
providing, using the one or more physical processors, a selection as to whether to enable individual ones of the one or more widgets to reward users of the site and/or app that share content via individual ones of the one or more widgets when integrated with the site and/or app to the gamification server, wherein providing the selection facilitates the generation, at the gamification server, of the one or more widgets.

8. The method of claim 3, further comprising:
providing, using the one or more physical processors, a selection as to whether to enable individual ones of the one or more widgets to display one or more achievement representations corresponding to one or more achievements associated with a user of the site and/or app and/or one or more available achievements the user of the site and/or app has not yet accomplished to the gamification server, wherein providing the selection facilitates the generation, at the gamification server, of the one or more widgets.

9. The method of claim 3, further comprising:
providing, using the one or more physical processors, a selection as to whether to enable individual ones of the one or more widgets to display a leaderboard to the gamification server, the leaderboard including a list of currencies, achievements, points, and/or scores of one or more users associated with the site and/or app, wherein providing the selection facilitates the generation, at the gamification server, of the one or more widgets.

10. The method of claim 1, wherein the gamification analytics are associated with an economy, the economy utilizing the game mechanics to facilitate exchange and/or consumption of virtual goods and/or services, wherein the economy includes a definition of a currency to be used in conjunction with the site and/or app, the currency operating as one or more of a counter that counts the one or more actions of the user, a point system, or a currency for purchase transactions.

11. The method of claim 10, wherein the economy defines one or more transactions of currency that occur responsive to one or more corresponding user actions.

12. The method of claim 10, wherein the economy is defined to include an assignment of one or more nested transactions to a transaction group, individual ones of the one or more nested transactions being associated with one or more different currencies corresponding to a common user action.

13. The method of claim 12, wherein the entire transaction group fails responsive to failure of one or more of the nested transactions assigned to the transaction group.

14. The method of claim 12, wherein the economy defines an end-user-cap and a time interval associated with the transaction group, the end-user-cap being a maximum number of times the transaction group is valid for a given user within the time interval.

15. The method of claim 10, wherein the economy defines one or more quests, individual ones of the one or more quests including a set of tasks and/or segments configured to unlock one or more achievements upon completion of a defined number of tasks and/or segments.

16. The method of claim 10, wherein the economy defines unique-token-based support for idempotency.

17. The method of claim 1, wherein the one or more API calls are authenticated at the gamification server.

18. The method of claim 17, wherein the authentication is performed via one or more encrypted communication channels associated with the gamification server and/or the server.

19. The method of claim 10, wherein the economy is defined to include one or more achievements associated with the economy.

20. The method of claim 19, wherein individual ones of the one or more achievements correspond to one or more achievement representations.

21. The method of claim 20, wherein the one or more achievement representations include a graphic displayable as a badge, virtual token, and/or emblem.

22. The method of claim 10, wherein the economy defines one or more levels associated with the game mechanics of the site and/or app.

23. The method of claim 10, wherein the economy defines one or more awards associated with the game mechanics of the site and/or app.

24. The method of claim 10, wherein the economy defines one or more virtual goods associated with the site and/or app, individual ones of the one or more virtual goods being associated with one or more of a non-physical object, a physical object, a service, a discount, or an access privilege to be transacted in conjunction with the site and/or app.

25. The method of claim 10, wherein the economy defines a URL associated with one or more objects economy, individual ones of the one or more objects including one or more of an achievement representation, a badge, a level, an award, or a virtual good.

26. The method of claim 10, wherein the economy defines one or more publisher defined attributes associated with one or more objects within the economy, individual ones of the one or more objects including one or more of a currency, transaction, achievement representation, a badge, a level, an award, or a virtual good.

27. The method of claim 1, further comprising obtaining, using the one or more physical processors, one or more reports on the gamification analytics associated with the game mechanics of the site and/or app from the gamification server.

28. A system configured to incorporate game mechanics into a web site, mobile site, and/or app using an automated access, self-serve application programming interface (API), the system comprising:
a server associated with a publisher of a site and/or app, the server including one or more physical processors configured to execute one or more computer program components to cause the one or more processors to:
host the site and/or app configured for user interaction via a client computing platform, the site and/or app being associated with a publisher of the site and/or app, the site and/or app being a non-game application, wherein a user associated with the client computing platform interacts with the site and/or app through views generated by the client computing platform from information received from the server, and wherein the user performs one or more actions within the site and/or app through input entered to the site and/or app on the client computing platform;
generate one or more API calls to a remote gamification server, the gamification server being physically separate and distinct from the server, the one or more API calls indicating the one or more actions of the user; and effectuate presentation of the user interface within views of the site and/or app generated by the client computing platform, the user interface including gamification analytics generated at the gamification server based on the one or more API calls, the gamification analytics being associated with one or more game mechanics, wherein the game mechanics determine a correspondence between the one or more user actions and the gamification analytics, and wherein integration of the user interface within views of the site and/or app provides the game mechanics to the site and/or app such that the one or more actions of the user within the site and/or app are incentivized by the game mechanics.

29. A non-transitory computer-readable storage medium having instructions embodied thereon, the instructions being executable by a physical processor included in a server to perform a method for incorporating game mechanics into a web site, mobile site, and/or app using an automated access, self-serve application programming interface (API), the method comprising:

hosting, using the physical processor, the site and/or app configured for user interaction via a client computing platform, the site and/or app being associated with a publisher of the site and/or app, the site and/or app being a non-game application, wherein a user associated with the client computing platform interacts with the site and/or app through views generated by the client computing platform from information received from the server, and wherein the user performs one or more actions within the site and/or app through input entered to the site and/or app on the client computing platform;

generating, using the physical processor, one or more API calls to a remote gamification server, the gamification server being physically separate and distinct from the server, the one or more API calls indicating the one or more actions of the user; and effectuating, using the physical processor, presentation of a user interface within views of the site and/or app generated by the client computing platform, the user interface including gamification analytics generated at the gamification server based on the one or more API calls, the gamification analytics being associated with one or more game mechanics, wherein the game mechanics determine a correspondence between the one or more user actions and the gamification analytics, and wherein integration of the user interface with the site and/or app provides the game mechanics to the site and/or app such that the one or more actions of the user within the site and/or app are incentivized by the game mechanics.

* * * * *